United States Patent
Wright, Jr.

(10) Patent No.: US 9,674,455 B1
(45) Date of Patent: Jun. 6, 2017

(54) PROGRAMMABLE MANUAL MODE FOR DIGITAL CAMERAS

(71) Applicant: Donald Frederick Wright, Jr., Graz (AT)

(72) Inventor: Donald Frederick Wright, Jr., Graz (AT)

( * ) Notice: Subject to any disclaimer, the term of this patent is extended or adjusted under 35 U.S.C. 154(b) by 0 days.

(21) Appl. No.: 15/341,856

(22) Filed: Nov. 2, 2016

Related U.S. Application Data

(60) Provisional application No. 62/308,276, filed on Mar. 15, 2016.

(51) Int. Cl.
 *H04N 5/235* (2006.01)
 *H04N 5/232* (2006.01)
 *H04N 5/225* (2006.01)

(52) U.S. Cl.
 CPC ......... *H04N 5/2352* (2013.01); *H04N 5/2256* (2013.01); *H04N 5/23212* (2013.01); *H04N 5/23222* (2013.01)

(58) Field of Classification Search
 CPC ............... H04N 5/2352; H04N 5/2256; H04N 5/23212; H04N 5/23222
 See application file for complete search history.

(56) References Cited

U.S. PATENT DOCUMENTS

| | | | |
|---|---|---|---|
| 8,305,487 B2 * | 11/2012 | Cha ...................... | H04N 5/2353 348/222.1 |
| 8,446,481 B1 * | 5/2013 | Geiss ................... | H04N 5/2353 348/221.1 |
| 2007/0147820 A1 * | 6/2007 | Steinberg ............... | H04N 5/272 396/155 |

\* cited by examiner

*Primary Examiner* — Tuan Ho
(74) *Attorney, Agent, or Firm* — Dinsmore & Shohl LLP

(57) ABSTRACT

"Programmed manual modes" mimic the processes a digital camera user goes through manually, but at the speed of the processor built in the camera. Each program preferably includes an exposure condition and a set of shooting parameters, with each parameter having a range and a priority. The processor automatically applies the parameters in sequential fashion within their ranges based upon their priorities, causing the camera to take a picture if and when the exposure condition is met. The shooting parameters may include one or more of ISO, aperture and shutter speed, and the ranges generally include upper or lower limits. The program may be created in the camera or downloaded into the camera from an external device, and the program may be written in a format that can be shared with other camera users. The program preferably includes one or more pre-compose settings to establish a set of initial shooting conditions.

20 Claims, 2 Drawing Sheets

PROGRAMMABLE MANUAL MODE FOR DIGITAL CAMERAS

REFERENCE TO RELATED APPLICATION

This application claims priority from U.S. Provisional Patent Application Ser. No. 62/308,276, filed Mar. 15, 2016, the entire content of which is incorporated herein by reference.

FIELD OF THE INVENTION

This invention relates generally to digital photography and, in particular, to a programmable manual mode for digital cameras.

BACKGROUND OF THE INVENTION

There are typically three phases associated with taking a photo. These phases will herein be referred to as "Pre-Compose," "Compose," and "Shutter Release." In each phase, the operator typically has many settings at their disposal to achieve the photo they desire.

Pre-Compose is the time before the photographer begins to compose the picture. This is usually not a time-critical phase, and the photographer adjusts common parameters such as:

Shooting mode: This is a setting that sets the camera for how many pictures to take upon release of the shutter from 1 picture per shutter release to continuous shooting while the shutter button is held down;

Bracketing: Where the camera takes multiple photos in succession at different exposures;

Focus modes: Selecting how the camera will focus. This typically ranges from a single small point to a wide area of the image and the camera finds the closest object and focuses on that. There are typically also settings to describe how the camera tracks the objects to focus, one time focus, etc.; and Metering: Selecting how the computer in the camera analyzes what the camera is pointed at and calculates the exposure of the image. There are typically several different ways to tell the camera how to meter the exposure for the image.

Compose is the time when the photographer composes the picture and is typically a very time critical phase. This typically starts when the photographer presses the shutter button halfway or pressing a button to start the metering and focus process. The camera then feeds back the level of exposure based on the settings of the camera. The photographer then adjusts the settings of the camera to expose the photo to the desired level. These settings typically include:

ISO: this is the setting for the sensitivity of the sensor to light. The higher the setting, the more sensitive the sensor is which allows taking an image in darker situations. However, this higher sensitivity often leads to artifacts (commonly referred to as noise) in the picture;

Shutter speed: This is the amount of time the shutter is open to expose the sensor to the light it needs to record the image. The faster the shutter speed, the less time the sensor is exposed, and the slower the shutter speed, the longer the sensor is exposed. This is dependent on the amount of light available. If there is little light then a longer exposure is needed. However, this often results in blurry shots because either the camera or the subject moves during the time the shutter is open. Sometimes this shutter is left open purposely to capture this motion or blur artistically;

Aperture: The aperture setting refers to the amount the lens is open to let in light. A very large aperture lets in the most light, but has the shortest depth of field (the amount of the image that is "in focus"). The smallest aperture has the largest depth of field, but lets in the least amount of light; and Exposure: This controls how much the photographer would like to over or under expose an image typically to make sure the main subject is exposed correctly if there are very bright or dark subjects in the image affecting the exposure measurement.

Shutter Release occurs when the photographer completely presses the shutter button and captures the image or images.

The primary parameters the photographer adjusts during photo shoots are what are called the pyramid of light: ISO, Aperture, and Shutter Speed. All three of these control how the light is used to compose the image. Adjusting any of these three elements affects the other two and photographers are constantly adjusting these three to get the image exposed how they desire in a crisp and clear image.

While many photographers prefer to set these settings themselves, many cameras have some form of "Automatic Mode" that uses the camera's intelligence to quickly make many of these setting decisions for the photographer. Nevertheless, photographers that want to exert more manual control than the "Automatic Mode" are continually adjusting these settings during their shots. Many cameras allow photographers to store settings that they wish to start with, usually in a menu or on the mode dial (sometimes called "Custom"), so that the photographer can quickly select the base settings they want to start with when they begin shooting. However, since the shots are always changing, the photographer has to move away from these base settings and quickly to adjust many of the parameters listed above for each shot.

The camera provides feedback to the photographer (typically in the viewfinder) about the exposure of the shot with the current settings, what the settings are, and then the photographer adjusts dials (or menus) to get the settings what they think they want, and take a shot. Then, typically the shooter looks at the shot on the built in screen on the camera to get an idea if the shot is what they desire and then usually they modify some settings and continue the shooting. However, most of the adjustments are made manually.

Some modes of operation try to "automate" these procedures. Modes like "aperture priority" and "shutter priority" allow the photographer to set one of the settings like aperture or shutter speed and then the camera does the adjustment of the other to maintain a properly exposed image. Some cameras even offer an automatic setting for ISO which even helps with the third leg of pyramid to allow the photographer to only have to adjust one of the three parameters. Such modes add convenience, but there remains a considerable amount of manual adjustment to be done during most shots. And since it is done manually by the photographer, it takes a significant amount of time when compared to the speed of the built-in camera computer that does this during automatic mode.

SUMMARY OF THE INVENTION

In digital photography, this invention bridges a gap between full manual and automatic shooting modes, enabling a user to create "programmed manual modes" that mimic the processes the user goes through manually, but at the speed of the computer built in the camera. The invention encompasses apparatus in the form of cameras modified in accordance with the invention, as well as associated methods of programming and use.

A digital camera according to the invention includes a user control associated with taking a picture, a memory for storing a digital image, and a processor for controlling camera function. However, is contrast to existing cameras, the processor is operative to receive a program including an exposure condition and a set of shooting parameters, each parameter having a range and a priority. When the user control is activated, the processor automatically applies the parameters in sequential fashion within their ranges based upon their priorities, causing the camera to take a picture if and when the exposure condition is met. The exposure condition may be variable and adjusted as the parameters are sequentially applied.

The shooting parameters associated with the programmed manual modes include one or more of ISO, aperture and shutter speed, and the ranges generally include upper or lower limits. The program may be created in the camera or using a device other than the camera and downloaded into the camera, and the program may be written in a format that can be shared with other camera users. The processor is further operative to store the sequence of parameters in a memory used by the camera when the control is activated.

The program preferably includes one or more pre-compose settings to establish bracketing, exposure, focus and shot sequence. Such pre-compose settings further include settings for a flash, GPS unit, intervalometer, movement device or other apparatus built in, attached to, or in communication with the camera.

DETAILED DESCRIPTION OF THE INVENTION

In broad and general terms, this invention allows a photographer to use the speed and accuracy of the computer built in the camera (typically already used for the built in "automatic mode") to perform sequential or continual adjustments to create their own "programmed manual modes" for their photography. This is accomplished by allowing the photographer to create "rules" or "macros" or "decisions" (herein referred to as "programs") which mimic the process they go through manually, but at the speed of the computer built in the camera.

Figure 3:
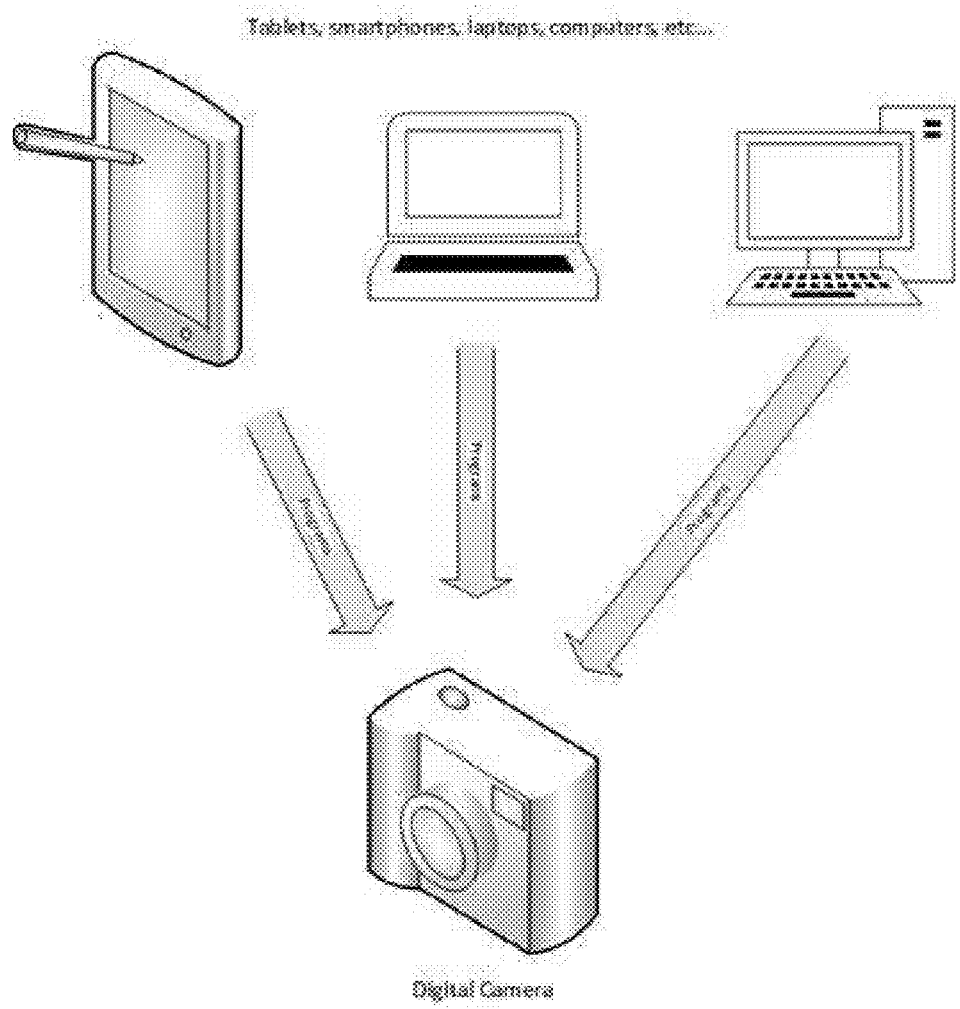
FIG. 3 is a diagram that shows how manual-mode programs may be developed on a PC, tablet, or smart phone using editing software.

These programs can be created and modified on the camera or on a separate device and then stored in the camera. Furthermore these programs can be basic .xml or other types of files which would allow photographers to share their profiles on social networks or other forms of communication to allow other photographers use their programs. As shown in FIG. 3, these programs would most often be built using software running on a PC, tablet, or smart phone using some kind of editor that will allow the user to build their programs, name them, give them a description, etc.

The user then can download the programs to the camera using the memory card, using wireless, or with a cable. The camera could have the capability of holding many programs depending on the memory size storing the programs in the camera. For example, have 99 "slots" to store programs in and then the user can select which slot is the active program during shooting. Note that, as used herein, "camera" means any device that has an image sensor, memory and processing electronics enabling still or sequential imagery to be gathered, displayed, stored and/or transmitted. As such, "digital camera" includes a smart phone with one or more sensors/cameras. Further, the same device used to build the programs described herein may be used to take the pictures and/or gather the imagery made possible by the programs.

Figure 1:
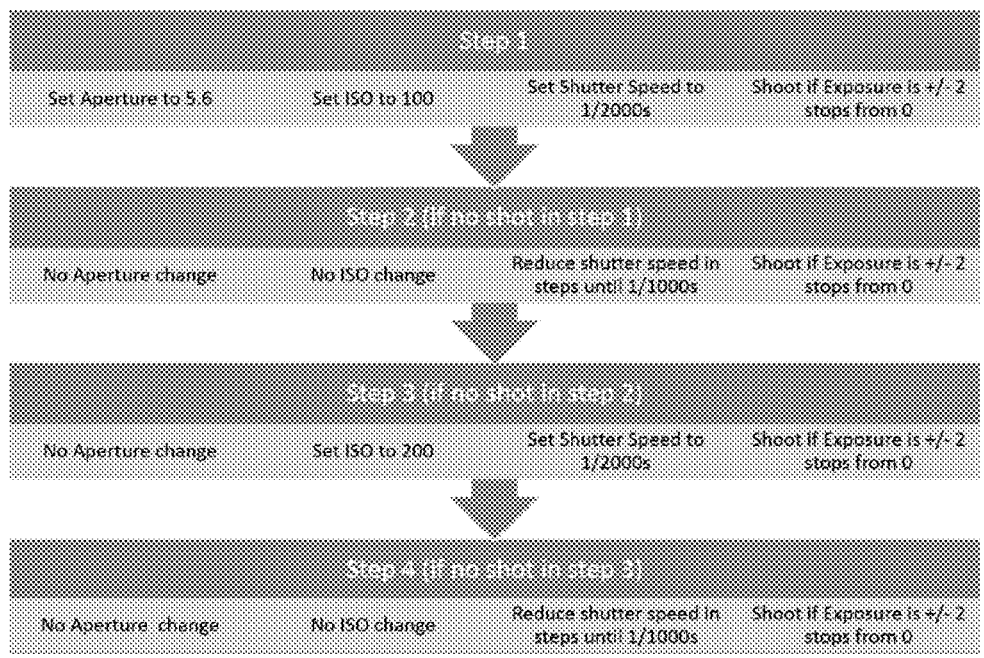
FIG. 1 shows one possible decision tree according to the invention wherein, for each step the user can enter upper and lower limits and priority for different settings enabling the camera to automatically start with the initial settings and then quickly adjust the settings through the ranges based on priority.

The programs could be in the form of a block diagram or flow chart, or even just using a chart. For example:
Pre-Compose Starting Settings:
Bracketing: off
Exposure mode: center
Focus: spot
Focus mode: One shot
Shooting mode: Single shot
Chart Example:

For the chart shown in FIG. 1, a possibility could be that for each step the user can enter the upper and lower limits for the different settings and the priority of each and the camera would quickly start with the initial settings and then quickly adjust the settings through the ranges based on priority. If at any time the shot criteria is met, the camera takes a photo. If not, it goes to the next step to try.
Pre-Compose Starting Settings:
Bracketing: off
Exposure mode: center
Focus: spot
Focus mode: One shot
Shooting mode: Single shot

| Aperture Range | Priority | ISO Range | Priority | Shutter Speed Range | Priority | Shot Criteria |
|---|---|---|---|---|---|---|
| 10-5.6 | 2 | 100-400 | 3 | 2000-1000 | 1 | Exposure +/- 1 stop from 0 |
| 10-5.6 | 2 | 100-800 | 3 | 2000-1000 | 1 | Exposure +/- 2 stops from 0 |
| 5.6-2.8 | 2 | 100-800 | 3 | 2000-1000 | 1 | Exposure +/- 2 stops from 0 |
| 5.6-2.8 | 1 | 100-800 | 2 | 1000-640 | 3 | Exposure +/- 3 stops from 0 |
| ... | | | | | | |

In this example, the camera would first set the aperture to 10, the ISO to 100, and the shutter speed to 2000 and if the exposure is within 1 stop from 0, the photo will be taken. If it is outside the shot criteria, if the exposure is too high, it could give a warning that the exposure is higher than the starting point of the program. Typically, the user would have very high initial settings and the camera would need to compensate for underexposure. If the exposure is to low, the camera would start adjusting the lowest priority item to try and get the right exposure. In this case, raise the ISO from 100 to 200 and then check the exposure. If within the criteria, take the shot. If not, raise the ISO to 400. Check the criteria and take the shot if exposure is within the criteria. If not, since the ISO upper range is met, the camera returns the ISO to 100 and then changes the next priority item which is the aperture. It sets the aperture to the next value in the range and then repeats the cycle by adjusting the ISO to see if the shot criteria can be met. It can do this for all three settings and ranges and if not able to take a shot, go to the next step.

The camera would also have the ability to modify the programs using the screen on the back of the camera. This would not be the standard method as it would not be as efficient as using the programming software.

Figure 2:
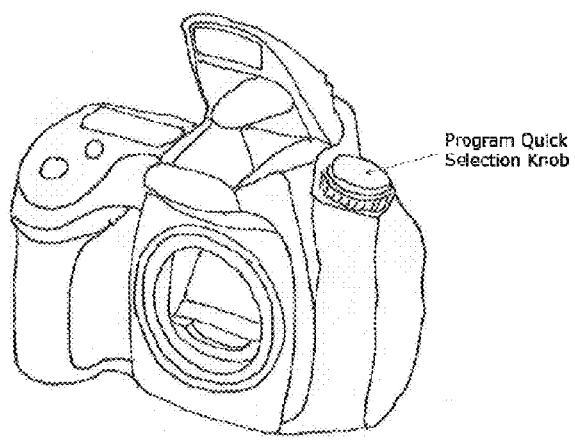
FIG. 2 is a drawing of a digital camera without a lens showing a possible location for a program quick selection knob.

Furthermore, camera could have some way for the user to store some favorites that can be quickly selected on a quick selection knob located on the camera, shown in FIG. 2.

EXAMPLES

Program Name: Sports 1
Pre-Compose Starting Settings:
Bracketing: off
Exposure mode: center
Focus: Zone
Focus mode: Continuous (Servo)
Shooting mode: High Speed Continuous

| Aperture Range | Priority | ISO Range | Priority | Shutter Speed Range | Priority | Shot Criteria |
|---|---|---|---|---|---|---|
| 10-5.6 | 2 | 100-400 | 3 | 2000 | 1 | Exposure +/− 1 stop from 0 |
| 10-5.6 | 2 | 100-800 | 3 | 2000 | 1 | Exposure +/− 2 stops from 0 |
| 5.6-2.8 | 2 | 100-800 | 3 | 2000 | 1 | Exposure +/− 2 stops from 0 |
| 5.6-2.8 | 3 | 800-1600 | 2 | 2000 | 1 | Exposure +/− 3 stops from 0 |
| ... | | | | | | |

Since for sports, a high shutter speed is usually important, the user may choose shutter speed to always be 1/2000s, but to adjust first the ISO for the first three steps followed by the aperture. In the fourth step, to really try and get the shot by adjusting the aperture first, followed by an even wider range of ISO and wider shot criteria.

Program Name: Sunset Beach 1
Pre-Compose Starting Settings:
Bracketing: off
Exposure mode: center
Focus: Zone
Focus mode: One Shot
Shooting mode: Single Shot

| Aperture Range | Priority | ISO Range | Priority | Shutter Speed Range | Priority | Shot Criteria |
|---|---|---|---|---|---|---|
| 10-12 | 2 | 100-400 | 3 | 5 s-2.5 s | 1 | Exposure +/− 1 stop from 0 |
| 12-16 | 2 | 100-400 | 3 | 5 s-2.5 s | 1 | Exposure +/− 2 stops from 0 |
| 16-22 | 2 | 100-400 | 3 | 5 s-2.5 s | 1 | Exposure +/− 2 stops from 0 |
| ... | | | | | | |

For this sunset beach example, the user has a much different use case. Typically the photographer starts shooting before the sun sets and the conditions are bright, yet the photographer wants to capture a long exposure to smooth the water. So, when the camera firsts tries to take the shot, the shot is over exposed. In this case, the camera tries the lowest priority setting which is ISO. But, since it started at 100 and it is already over exposed and by moving it to 200 it will just increase the exposure, the camera immediately moves to priority 2. It then changes the aperture to 12 and sees if the criteria is met; if not, it moves to priority 1 which is to lower the shutter speed and try again. If it still is too over exposed, it moves to step two, and so on. This process continues until the shot is taken, unless the scene is just too bright for this program to take a picture.

Program Name: Portrait 1
Pre-Compose Starting Settings:
Bracketing: off
Exposure mode: center
Focus: Zone
Focus mode: One Shot
Shooting mode: Single Shot

| Aperture Range | Priority | ISO Range | Priority | Shutter Speed Range | Priority | Shot Criteria |
|---|---|---|---|---|---|---|
| 1.4 | 1 | 100-400 | 3 | 1000-640 | 2 | Exposure +/− 1 stop from 0 |
| 1.4 | 1 | 100-400 | 2 | 800-320 | 3 | Exposure +/− 2 stops from 0 |
| 1.4 | 1 | 100-800 | 3 | 640-125 | 2 | Exposure +/− 3 stops from 0 |
| ... | | | | | | |

For portrait photography, often the photographer used a very shallow depth of field to keep the eyes of the subject in sharp focus, but then make the rest of the face softer using the shallow depth of field. So this program keeps the depth of field at 1.4 throughout but adjusts the ISO and shutter speeds to get the desired photo. First in the first step it tries to adjust the ISO and then the shutter speed.

Additionally, the camera could use an external button to hold the current settings that have been "found" by the program. So, if the program had to go to step three to find that ISO400, aperture 5.6 and shutter speed 640 gives the desired exposure, by pressing or holding this button those settings are held in memory until the camera is told to start at the beginning again with the program. When the program starts and stops could also be part of the program.

Note that the camera may also be programmed to record the steps it took to achieve the condition to take the picture. The photographer can then look back at a photo and see how many steps it took and the decisions the computer in the camera made to get to the point of taking the picture. This could be stored somehow in the metadata for the photo or in a separate file.

The program could also have settings like bracketing and how many stops to bracket, HDR settings, autofocus modes, metering modes, shooting modes, etc. programmed into the program. The user could also copy, modify, and save the programs on the camera in the field and then upload them back to the original program in the computer, tablet, smartphone, etc. for saving.

For low-light applications where a flash is used, the pre-compose settings could also include the settings for the flash. Another option could be that the flash settings could also be adjusted in the program to try to achieve the desired exposure using the different flash settings. In situations where multiple flashes are used, the system could also set the parameters for each flash or adjust them based on the program.

The program could also be able to set the pre-compose settings for any other built in or attached devices such as GPS units, intervalometer, movement devices, etc.

The programming software would incorporate a friendly graphical user interface to generate the programs. It would also control the uploads and downloads to the camera and could even have the possibility of uploading saving as a file that can be shared (or sold) to other users to allow users to create a community of shared programs that users can use in their cameras.

For photographers that want to generate a business by selling their programs, and encryption method could be used to make viewing, editing, changing the programs unavailable, or even only partly encrypted (so the user could change certain settings of the program).

The invention claimed is:

1. A digital camera, comprising:
a user control associated with taking a picture, the user control enabling a user to select one of a plurality of user-created, programmed manual modes as an active shooting mode;
a memory for storing the plurality of user-created, programmed manual modes; and
a processor operative to:
  a) receive and store one of the user-created, programmed manual modes when selected with the user control, each of the user-created programmed manual modes comprising an exposure condition and a set of shooting parameters, each shooting parameter having a range of exposure settings and a parameter priority, each range of exposure settings comprises an upper limit and a lower limit, and each parameter priority defining an order in which the shooting parameters are automatically adjusted, relative to each other, to meet the exposure condition;
  b) automatically apply the shooting parameters of the selected user-created, programmed manual mode in a sequence that is based on the parameter priority associated with each shooting parameter, wherein the shooting parameters are applied by adjusting the applied parameter within its range of exposure settings until the exposure condition is met or, if the range of settings is exhausted without meeting the exposure condition, advancing the sequence of applying the shooting parameters to a lower priority shooting parameter until the exposure condition is met; and
  c) cause the camera to take a picture and store the picture in the memory when the exposure condition of the selected user-created, programmed manual mode is met.

2. The digital camera of claim 1, wherein the shooting parameters include one or more of ISO, aperture, and shutter speed.

3. The digital camera of claim 1, wherein each user-created, programmed manual mode is created in the digital camera or using a device other than the digital camera and downloaded into the digital camera.

4. The digital camera of claim 1, wherein each user-created, programmed manual mode is written in a format configured to be shared with other camera users.

5. The digital camera of claim 1, wherein each user-created, programmed manual mode includes one or more pre-compose settings comprising bracketing on/off, exposure mode, focus mode, single shot sequence, and multiple shot sequence.

6. The digital camera of claim 5, wherein the one or more pre-compose settings further comprise settings for a flash.

7. The digital camera of claim 5, further comprising one or more additional pre-compose settings for an apparatus that is at least one of built in, attached to, and in communication with the digital camera.

8. The digital camera of claim 1, wherein the exposure condition of the selected user-created, programmed manual mode is variable and configured to be adjusted as the shooting parameters are applied in the sequence.

9. The digital camera of claim 1, wherein the processor is further operative to store the sequence of shooting parameters in the memory used by the digital camera.

10. A method of taking a picture, comprising the steps of:
selecting as an active shooting mode, and through a user control, one of a plurality of user-created, programmed manual modes from a memory of a digital camera having the user control associated with taking a picture;
wherein each of the user-created programmed manual modes comprises an exposure condition and a set of shooting parameters, each shooting parameter having a range of exposure settings and a parameter priority, each range of exposure settings comprises an upper limit and a lower limit, and each parameter priority defining an order in which the shooting parameters are automatically adjusted, relative to each other, to meet the exposure condition;
automatically applying the shooting parameters of the selected user-created, programmed manual mode in a sequence that is based on the parameter priority associated with each shooting parameter, wherein the shooting parameters are applied by adjusting the applied parameter within its range of exposure settings until the exposure condition is met or, if the range of settings is exhausted without meeting the exposure condition, advancing the sequence of applying the shooting parameters to a lower priority shooting parameter until the exposure condition is met; and
taking a picture and storing the picture in memory when the exposure condition of the selected user-created, programmed manual mode is met.

11. The method of claim 10, wherein the shooting parameters include one or more of ISO, aperture and shutter speed.

12. The method of claim 10, wherein each user-created, programmed manual mode is created in the digital camera or using a device other than the digital camera and downloaded into the digital camera.

13. The method of claim 10, wherein each user-created, programmed manual mode is written in a format configured to be shared with other camera users.

14. The method of claim 10, wherein each user-created, programmed manual mode includes one or more pre-compose criteria comprising bracketing on/off, exposure mode, focus mode, single shot sequence, and multiple shot sequence.

15. The method of claim 14, wherein the one or more pre-compose criteria further comprise flash settings.

16. The method of claim 14, wherein the pre-compose criteria further comprise settings for an apparatus that is at least one of built in, attached to, and in communication with the digital camera.

17. The method of claim 10, wherein the exposure condition of the selected user-created, programmed manual mode is variable and configured to be adjusted as the shooting parameters are applied in the sequence.

18. The method of claim 10, including the step of storing the sequence of shooting parameters in the memory used by the digital camera.

19. The digital camera of claim 7, the apparatus comprising one of a GPS unit, an intervalometer, and a movement device.

20. The method of claim 16, the apparatus comprising one of a GPS unit, an intervalometer, and a movement device.

* * * * *